(12) United States Patent
Blume et al.

(10) Patent No.: US 6,268,424 B1
(45) Date of Patent: Jul. 31, 2001

(54) PRECIPITATED SILICIC ACID

(75) Inventors: Anke Blume; Burkhard Freund; Bernhard Schwaiger, all of Erftstadt; Mustafa Siray, Bonn; Stefan Uhrlandt, Köln, all of (DE)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 09/389,380

(22) Filed: Sep. 3, 1999

(30) Foreign Application Priority Data

Sep. 3, 1998 (DE) .............................. 198 40 153

(51) Int. Cl.$^7$ ....................................... C08K 3/00
(52) U.S. Cl. ..................... 524/493; 423/327.1; 423/333; 423/335; 423/339
(58) Field of Search .................. 524/492, 493; 423/327.1, 333, 335, 339

(56) References Cited

U.S. PATENT DOCUMENTS

| | | |
|---|---|---|
| 4,040,858 | 8/1977 | Wason . |
| 5,800,608 | 9/1998 | Bomal et al. . |
| 5,876,494 | 3/1999 | Bomal et al. . |
| 5,882,617 | 3/1999 | Chevallier et al. . |
| 5,925,708 | 7/1999 | Esch et al. . |

FOREIGN PATENT DOCUMENTS

| | | |
|---|---|---|
| 2344805 | 3/1974 | (DE) . |
| 2610207 | 9/1976 | (DE) . |
| 4423493 | 2/1995 | (DE) . |
| 0647591 | 4/1995 | (DE) . |
| 19740440 | 3/1999 | (DE) . |
| 0647591 | 4/1995 | (EP) . |
| 0745558 | 12/1996 | (EP) . |
| 0901986 | 3/1999 | (EP) . |
| 9509127 | 4/1995 | (WO) . |
| WO95/09128 | 4/1995 | (WO) . |
| 9630303 | 10/1996 | (WO) . |
| WO96/30303 | 10/1996 | (WO) . |
| WO96/30304 | 10/1996 | (WO) . |

*Primary Examiner*—Edward J. Cain
(74) *Attorney, Agent, or Firm*—Smith, Gambrell & Russell, LLP

(57) ABSTRACT

Precipitated silica having the following parameters:

| | |
|---|---|
| BET surface area | 80–180 m$^2$/g |
| CTAB surface area | 80–139 m$^2$/g |
| BET/CTAB ratio | 1.0–1.6 |
| Sears No. (consumption of 0.1 N NaOH) | 5–25 ml |
| DBP No. | 200–300 ml/100 g |
| Al$_2$O$_3$ content | <5% |
| wk coefficient | <3.4 |
| Degraded particles | <1.0 μm |
| Non-degradable particles | 1.0–100 μm | is prepared by reacting alkali silicate with mineral acids and aluminum sulfate solution at temperatures of 60–95° C. at a pH of 7.0–10.0 while stirring constantly, wherein the reaction is continued to a solids concentration of 40–110 g/l, the pH is adjusted to a value between 3 and 5, and the precipitated silica is filtered off, washed and then dried, and optionally ground or granulated.

20 Claims, 7 Drawing Sheets

$$wk = \frac{\text{Peak height of the non-degradable particles (B)}}{\text{Peak height of the degraded particles (A)}}$$

A' = Range from 0 to < 1.0 μm
B' = Range from 1.0 μm to 100 μm

PRECIPITATED SILICIC ACID

INTRODUCTION AND BACKGROUND

The present invention relates to precipitated silicic acids (silica), a process for their preparation, and their use in rubber mixtures.

It is known to incorporate precipitated silicas into rubber mixtures (see Wolff, Kautschuk, Gummi, Kunstst. 7 (1988) p.674). Precipitated silicas have to be readily dispersible when used in rubber mixtures. A poor dispersibility is often the reason why precipitated silicas are not used in tire mixtures.

Document WO 95/09128 discloses precipitated silicas that can be used in tires. Their use in tire carcasses is however not mentioned.

On account of the more stringent requirements of the tire industry, even the improved dispersion of this precipitated silicic acid is no longer sufficient for use in tire treads.

WO 96/30304 describes a precipitated silica that can be dispersed in tire treads.

Using the known precipitated silica described in WO 96/30304 it is possible to achieve a reduction in the rolling resistance of the tire by 20–30% compared to tires filled with carbon black. This corresponds to a saving in fuel of ca. 5%.

Different tire constituents contribute in various proportions to the rolling resistance of an automobile tire:

| Tread: | 50% |
|---|---|
| Belt.: | 20% |
| Carcase: | 10% |
| Side wall: | 10% |
| Tire bead: | 5% |
| Inner layer: | 5% |

In a truck tire the proportion of the individual tire segments to the rolling resistance differs from the distribution in an automobile tire:

| Tread: | 30% |
|---|---|
| Belt: | 20% |
| Carcase: | 24% |
| Side wall: | 10% |
| Tire bead: | 16% |

This distribution of the proportions contributing to the rolling resistance shows that in automobile tires 50% and in truck tires even up to 70% of the rolling resistance is due to structural parts of the tire carcase. Up to now carbon black has overwhelmingly been used as active filler in tire carcasses.

Some sections of the automobile industry demand that the rolling resistance be reduced by approximately a further 10%. Up to now it has not been possible to achieve his.

An object of the present invention is to achieve a further considerable reduction in the rolling resistance of tires.

Another object of the invention is to achieve a precipitated silica that is easily dispersible in tire carcasses.

Truck tire customers are in addition asking for an increase in the service life of truck tires. Another object of the present invention is to meet this request, combined with a reduction in the amount of heat generated.

SUMMARY OF THE INVENTION

The above and other objects can be achieved by a precipitated silica that is characterized by an $Al_2O_3$ content of 0.2 to 5.0 wt. % and a wk coefficient of less than 3.4 as described by the present invention.

The precipitated silica according to the invention can have a BET surface area of 80 to 180 $m^2/g$.

The precipitated silica according to the invention can have a CTAB surface area of 80 to 139 $m^2/g$.

The precipitated silica according to the invention is characterized by the following physico-chemical data:

| | |
|---|---|
| BET surface area | 80–180 $m^2/g$ |
| CTAB surface area | 80–139 $m^2/g$ |
| BET/CTAB ratio | 1.0–0.6 |
| Sears No. (consumption of 0.1 N NaOH) | 5–25 ml |
| DBP (dibutyl phthalate) No. | 200–300 ml/100 g |
| $Al_2O_3$ content | <5% |
| wk coefficient | <3.4 |
| Degraded particles | <1.0 μm |
| Non-degradable particles | 1.0–100 μm |

The physico-chemical data are determined using the following methods:

| | |
|---|---|
| BET surface area | Areameter, Fa. Ströhlein, according to ISO 5794/Annex D |
| CTAB surface area | At pH 9, according to Jay, Janzen and Kraus in "Rubber Chemistry and Technology" 44 (1971) 1287 |
| Sears No. | According to G. W. Sears, Analyst. Chemistry 12 (1956) 1982 |
| DBP No. | ASTM D 2414-88 |
| wk coefficient | Cilas Granulometer 1064 L (for description see below) |

The precipitated silica according to the invention in a preferred embodiment exhibits the following physico-chemical data:

| | |
|---|---|
| BET surface area | 90–150 $m^2/g$ |
| CTAB surface area | 80–130 $m^2/g$ |
| BET/CTAB ratio | 1.0–1.6 |
| Sears No. (consumption of 0.1N NaOH) | 5–25 ml |
| DBP No. | 200–300 ml/100 g |
| $Al_2O_3$ content | <2% |
| wk coefficient | <3.4 |
| Degraded particles | <1.0 μm |
| Non-degradable particles | 1.0–30 μm |

The precipitated silica according to the invention in a particularly preferred embodiment exhibits the following physico-chemical data:

| | |
|---|---|
| BET surface area | 90–150 $m^2/g$ |
| CTAB surface area | 80–130 $m^2/g$ |
| BET/CTAB ratio | 1.0–1.6 |
| Sears No. (consumption of 0.1N NaOH) | 5–25 ml |
| DBP No. | 200–300 ml/100 g |

-continued

| | |
|---|---|
| Al$_2$O$_3$ content | 0.2–0.66% |
| wk coefficient | <3.4 |
| Degraded particles | <1.0 μm |
| Non-degradable particles | 1.0–30 μm |

The invention also provides a process for the preparation of the precipitated silica with the following physico-chemical parameters:

| | |
|---|---|
| BET surface area | 80–160 m$^2$/g |
| CTAB surface area | 80–140 m$^2$/g |
| BET/CTAB ratio | 1.0–1.6 |
| Sears No. (consumption of 0.1N NaOH) | 5–25 ml |
| DBP No. | 200–300 ml/100 g |
| Al$_2$O$_3$ content | 0.2–5% |
| wk coefficient | <3.4 |
| Degraded particles | <1.0 μm |
| Non-degradable particles | 1.0–100 μm | which is characterized in that alkali silicate is reacted with mineral acids and aluminum sulfate solution at temperatures of 60–95° C. at a pH of 7.0–11.0 while stirring continuously, the reaction is continued until a solids concentration of 40 g/l–110 g/l is achieved, the pH is adjusted to a value between 3 and 5, and the precipitated silica is filtered off, washed, then dried and optionally ground or granulated.

In a particular modification the addition of water glass, aluminum sulfate solution and sulfuric acid may be discontinued for 30–90 minutes and then continued.

In a preferred embodiment commercially available sodium water glass (modulus 3.2–3.5) may be reacted with sulfuric acid at a pH between 7.5 and 10.5, some of the sodium water glass being added beforehand to adjust the pH in the reaction vessel. The addition of water glass and sulfuric acid is maintained over a period of up to 120 minutes, wherein in a particular modification the addition may be discontinued for 30–90 minutes, following which the reaction mixture may be acidified to pH 3–5, filtered, washed and dried.

In order to achieve a particularly good dispersibility the simultaneous addition of sodium water glass and sulfuric acid preferably takes place over a period of between 40 and 90 minutes. The surface of the silica can be adjusted via the precipitation duration.

Chamber filter presses or membrane filter presses or band filters or rotary filters or automatic membrane filter presses or two of the filters in combination can be used for the filtration.

A pneumatic drier, rack drier, flash drier, spin-flash drier or similar equipment can be used for the drying.

In a further embodiment of the invention liquefied filter cakes can be dried in a spray drier with an atomizer or two-substance nozzle or a single-substance nozzle and/or integrated flow bed.

A roller-type compactor or similar equipment can be used for the granulation.

In a particularly preferred modification the precipitated silicas can be dried by means of a flash drying.

The precipitated silica according to the invention can be modified with organosilanes of the formulae I to III:

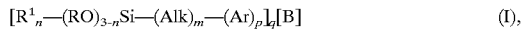

(I),

(II), or

(III), in which

B denotes —SCN, —SH, —Cl, —NH$_2$ (when q=1) or —S$_x$— (when q=2),

R and R$^1$ denote an alkyl group with 1 to 4 carbon atoms, the phenyl radical, all radicals R and R$^1$ in each case being the same or having a different meaning, R denotes a C$_1$ to C$_4$-alkyl group or C$_1$ to C$_4$-alkoxy group, n denotes 0, 1 or 2, Alk denotes a divalent linear or branched hydrocarbon radical with 1 to 18 carbon atoms, m denotes 0 or 1, Ar denotes an arylene radical with 6 to 12 carbon atoms, preferably with 6 carbon atoms, p denotes 0 to 1, provided that p and n do not simultaneously denote 0, x denotes an integer from 2 to 8, Alkyl denotes a monovalent linear or branched saturated hydrocarbon radical with 1 to 20 carbon atoms, preferably 2 to 8 carbon atoms, Alkenyl denotes a monovalent linear or branched unsaturated hydrocarbon radical with 2 to 20 carbon atoms, preferably 2 to 8 carbon atoms, and q denotes 1 or 2.

The silanes listed in Table 1 are preferably used:

TABLE 1

| | | Silane | | | |
|---|---|---|---|---|---|
| Degussa Nomenclature | Chemical Name | Chemical Formula | CAS-No. | EINECS | TSCA/MITI |
| Si 69 | Bis(triethoxysilylpropyl)tetra-sulfane | (C$_2$H$_5$O)$_3$Si—(CH$_2$)$_3$—S$_4$—(CH$_2$)$_3$—Si(OC$_2$H$_5$)$_3$ | 40372-72-3 | 254-896-5 | listed/2-3124 |
| Si 108 | Octyltrimethoxysilane | (CH$_3$O)$_3$Si—C$_8$H$_{17}$ | 3069-40-7 | 221-388-7 | not listed |
| Si 116 | Hexadecyltrimethoxysilane | (CH$_3$O)$_3$Si—C$_{16}$H$_{33}$ | 16415-12-6 | 240-464-3 | PMN/— |
| Si 118* | Octadecyltrimethoxysilane | (CH$_3$O)$_3$Si—C$_{18}$H$_{37}$ | 3069-42-9 | 221-339-2 | listed/— |
| Si 203 | Propyltriethoxysilane | (C$_2$H$_5$O)$_3$Si—C$_3$H$_7$ | 2550-02-9 | 219-842-7 | listed/— |
| Si 208 | Octyltriethoxysilane | (C$_2$H$_5$O)$_3$Si—C$_8$H$_{17}$ | 2943-75-1 | 220-941-2 | listed/— |
| Si 230 | 3-Chloropropyltriethoxsilane | (C$_2$H$_5$O)$_3$Si—(CH$_2$)$_3$—Cl | 5089-70-3 | 225-805-6 | listed/— |
| Si 255* | Ethyl(3-triethoxysilylpropyl)-carbamate | (C$_2$H$_5$O)$_3$Si—(CH$_2$)$_3$—NHCOOC$_2$H$_5$ | 17945-05-0 | 241-872-4 | listed/— |
| Si 264 | 3-Thiocyanatopropyltriethoxysilane | (C$_2$H$_5$O)$_3$Si—(CH$_2$)$_3$—SCN | 34708-08-2 | 252-161-3 | listed/— |
| Si 266* | Bis(triethoxysilylpropyl)disulfane | (C$_2$H$_5$O)$_3$Si—(CH$_2$)$_3$—S$_2$—(CH$_2$)$_3$—Si(OC$_2$H$_5$)$_3$ | 56706-10-6 | 260-350-7 | not listed |
| Si 270* | (3-Triethoxysilylpropyl)trimethyl- | (C$_2$H$_5$O)$_3$Si—(CH$_2$)$_3$—N$^+$(CH$_3$)$_3$Cl$^-$ | 84901-27-9 | 284-463-6 | not listed |

TABLE 1-continued

| | | | | | |
|---|---|---|---|---|---|
| Si 275* | ammoniumchloride in ethanol/water (3-Triethoxysilylpropyl)dimethyl-octadecylammoniumchloride in ethanol/water | $(C_2H_5O)_3Si$—$(CH_2)_3$—$N^+(CH_3)_2(C_{18}H_{37})Cl^-$ | 62117-57-1 | 263-413-7 | not listed |
| Mixil ® N 50*: Si 251/Si 252 | 3-Aminopropyltriethoxysilane/ Bis(3-triethoxysilylpropyl)amine | $(C_2H_5O)_3Si$—$(CH_2)_3$—$NH_2$/ $(C_2H_5O)_3Si$—$(CH_2)_3$—$NH$—$(CH_2)_3$—$Si(OC_2H_5)_3$ | 919-30-2/ 13497-18-2 | 213-048-4/ 236-818-1 | listed/2-2061 |
| Si 216 | Hexadecyltriethoxysilane | $(C_2H_5O)_3Si$—$C_{16}H_{33}$ | | | |

Silane Emulsions

| Degussa Nomenclature | Active Ingredient | Chemical Formula | CAS-No. | EINECS | TSCA |
|---|---|---|---|---|---|
| WS 374 | Bis(triethoxysilylpropyl)tetra-sulfane | $(C_2H_5O)_3Si$—$(CH_2)_3$—$S_4$—$(CH_2)_3$—$Si(OC_2H_5)_3$ | 40372-72-3 | 254-896-5 | listed |
| WS 405 | Octyltriethoxysilane | $(C_2H_5O)_3Si$—$C_8H_{17}$ | 2943-75-1 | 220-941-2 | listed |
| WS 431 | Hexadecyltriethoxysilane | $(C_2H_5O)_3Si$—$C_{16}H_{33}$ | 16415-13-7 | 240-465-9 | not listed |
| WS 650 | 3-Thiocyanatopropyltriethoxysilane | $(C_2H_3O)_3Si$—$(CH_2)_3$—$SCN$ | 34708-08-2 | 252-161-3 | listed |

*limited availability

The modification with organosilanes may be carried out in mixtures of 0.5 to 50 parts, referred to 100 parts of precipitated silica, in particular 2 to 15 parts, referred to 100 parts of precipitated silica, wherein the reaction between the precipitated silica and organosilane may be carried out during the preparation of the mixture (in situ) or outside (pre-modified) by spraying and then tempering the mixture, or by mixing the silane and the silica suspension, followed by drying and tempering.

In a preferred embodiment of the invention bis (triethoxysilylpropyl) tetrasulfane (trade name Si 69 of Degussa AG) may be used as silane.

BRIEF DESCRIPTION OF DRAWING

The present invention will be further understood with reference to the accompanying drawings, wherein.

DETAILED DESCRIPTION OF INVENTION

Figure 1:
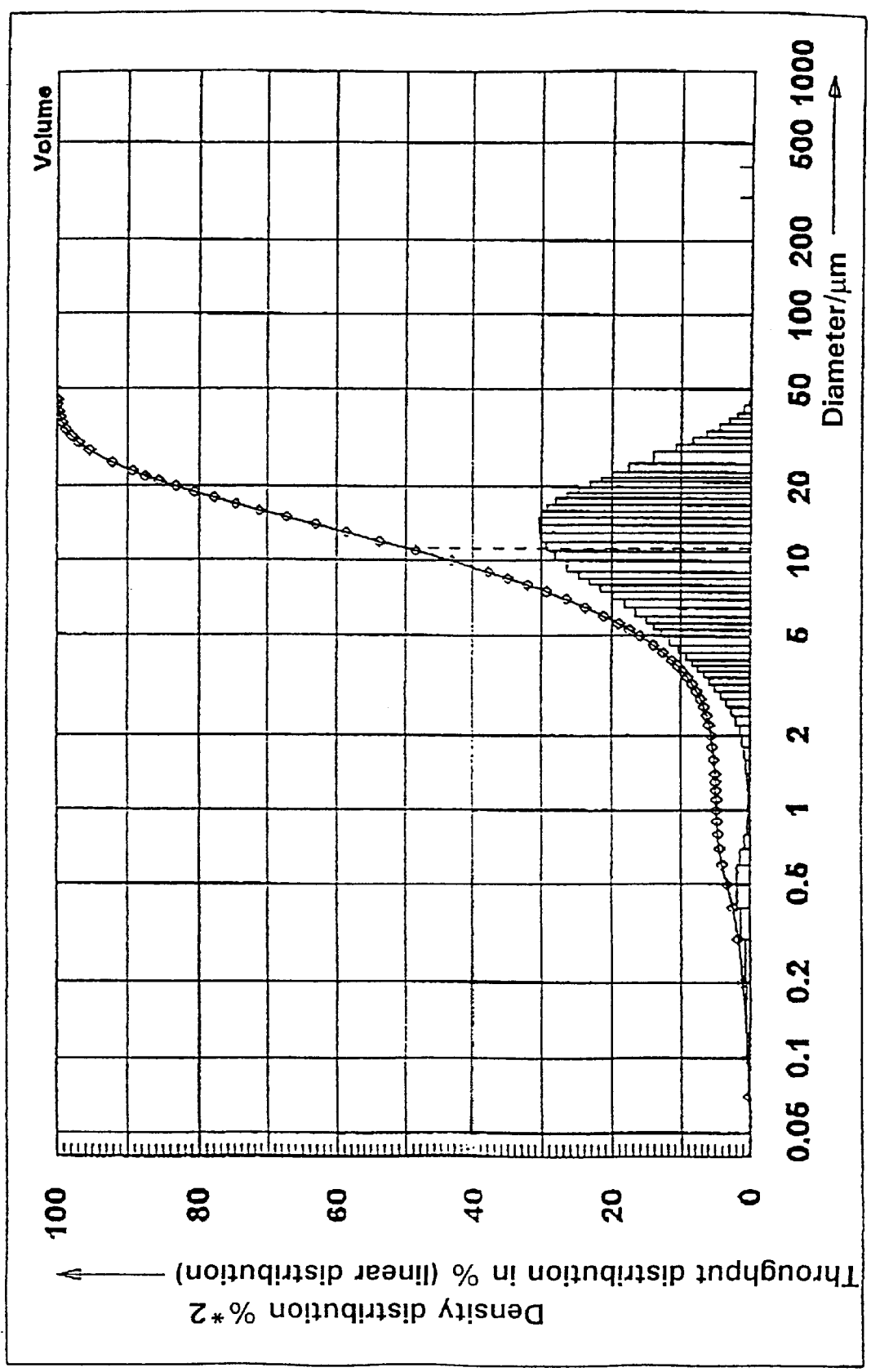
FIG. 1 is a graph of the results of measurements on Ultrasil VN2 by the laser diffraction method.
Figure 2:
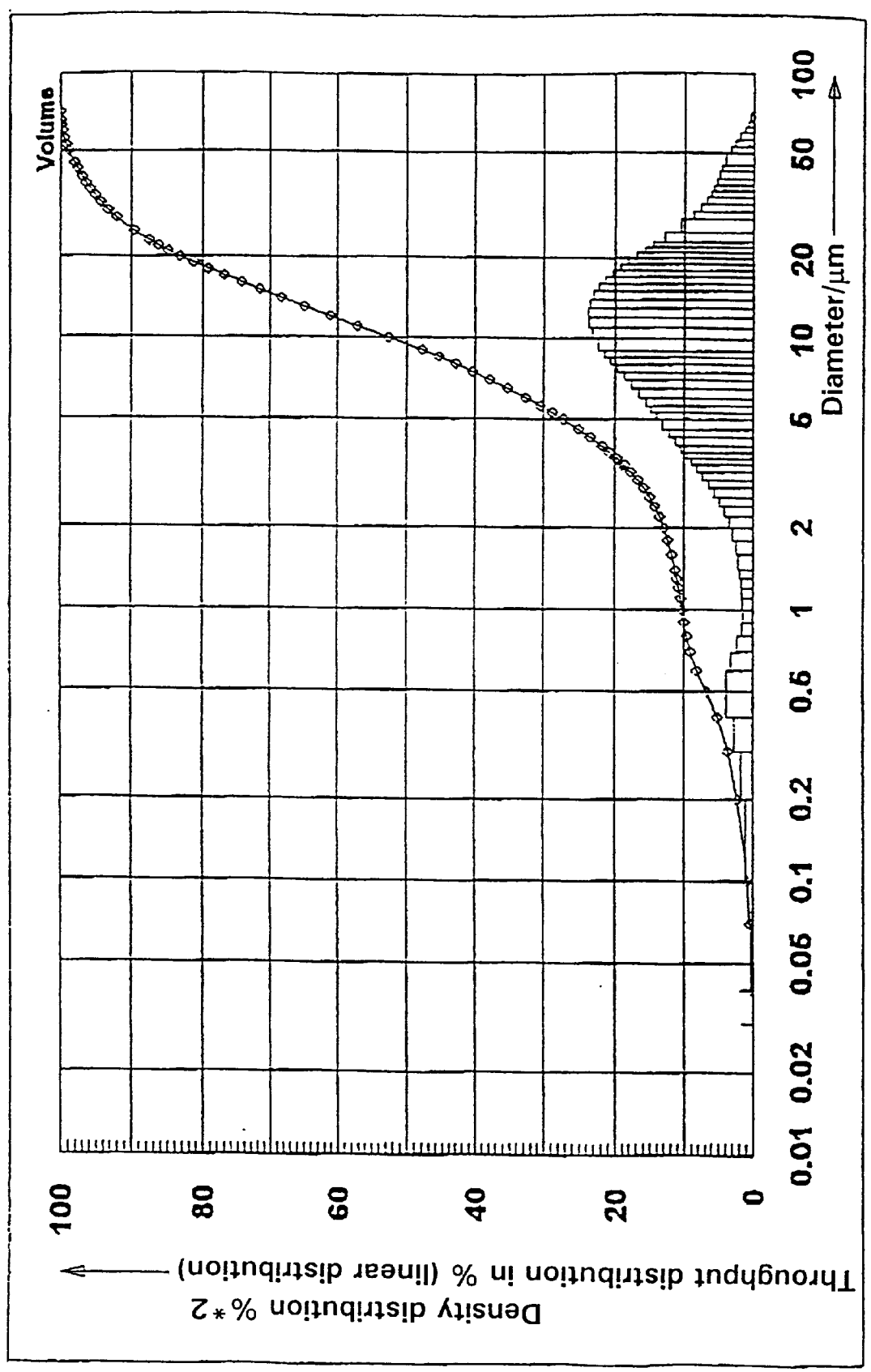
FIG. 2 is a graph of the results of measurements on Perkasil KS 300 by the laser diffraction method.
Figure 3:
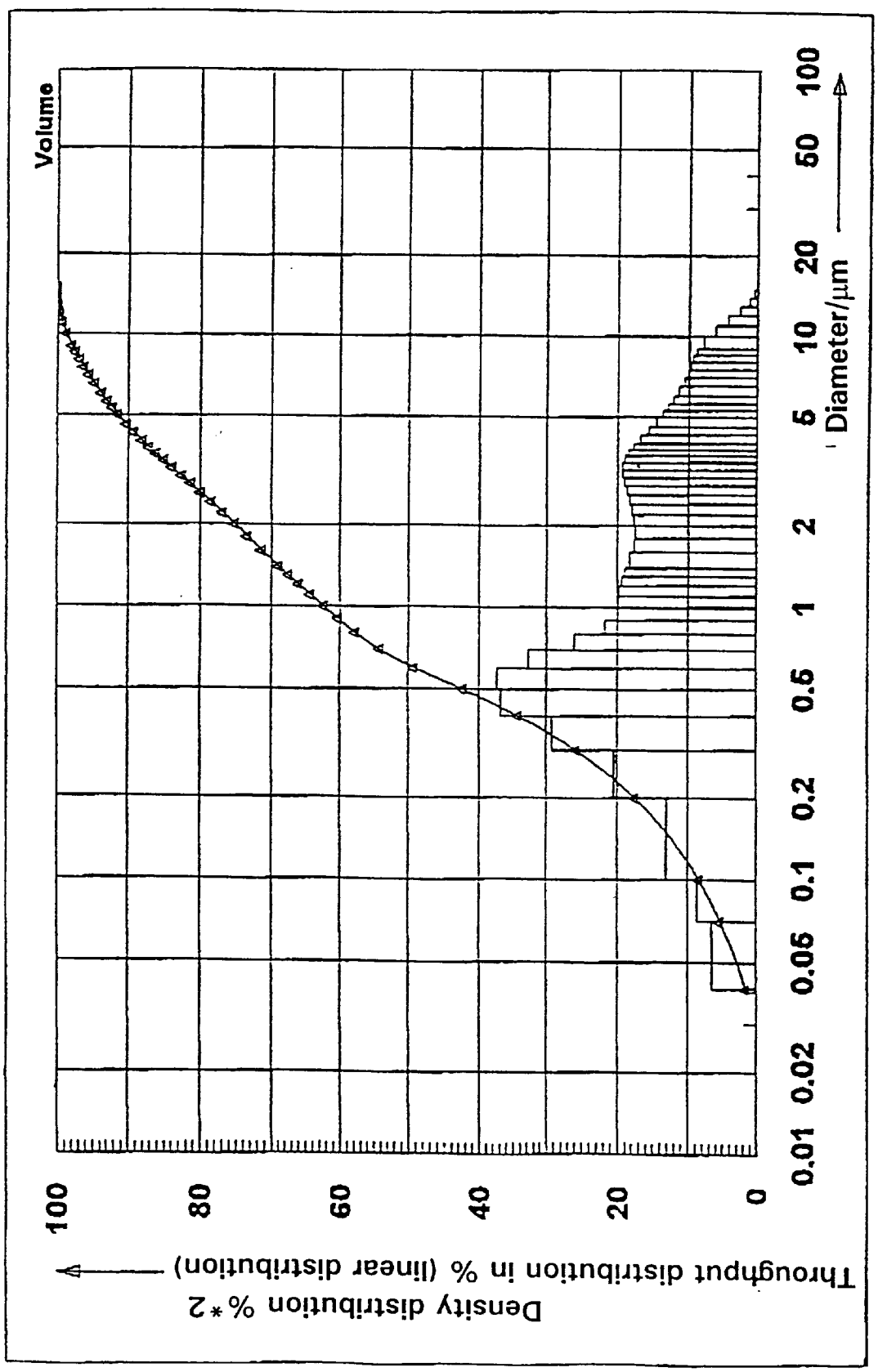
FIG. 3 is a graph of the results of measurements on silica according to the invention of Example 1 by the laser diffraction method.
Figure 4:
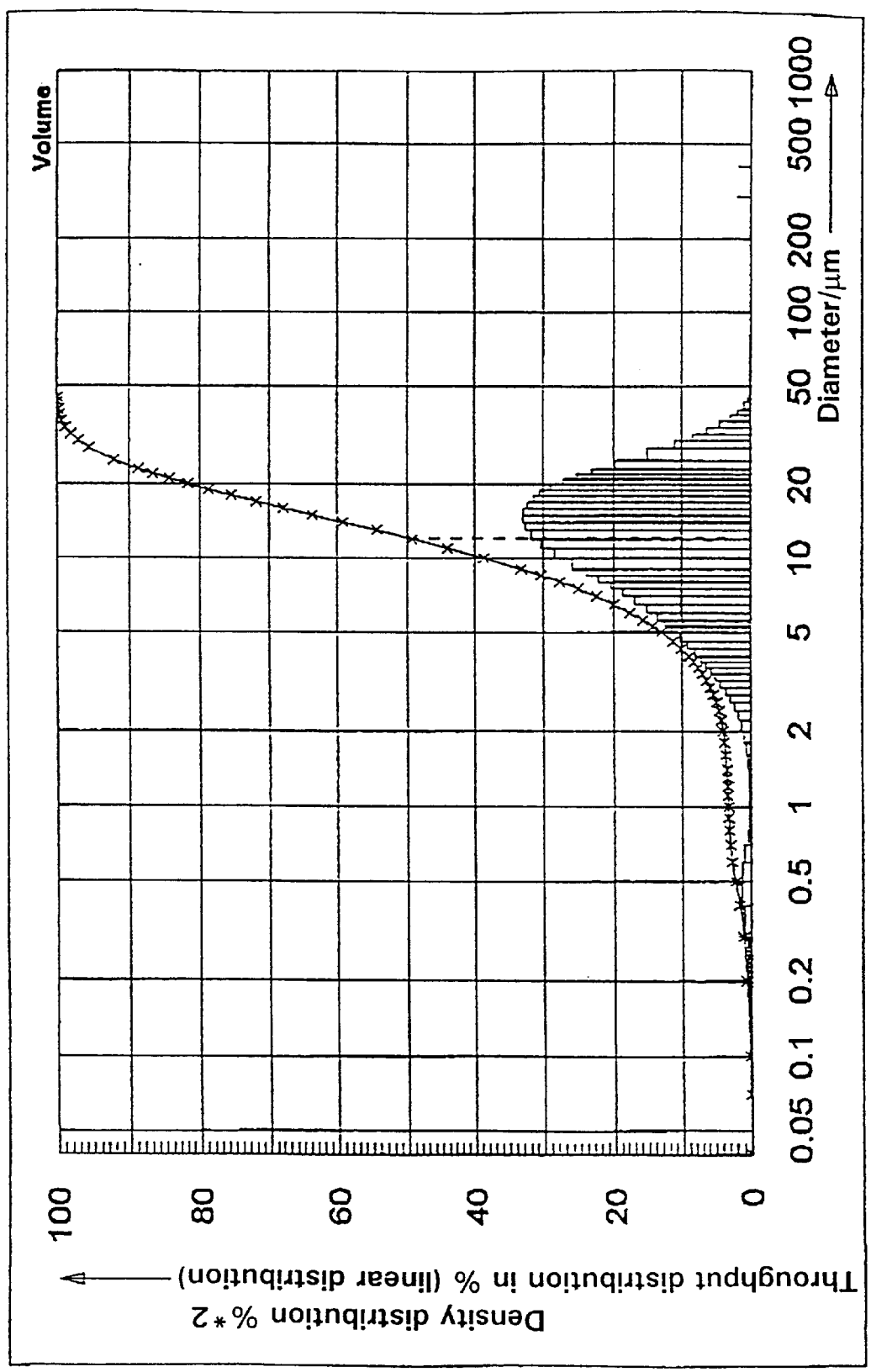
FIG. 4 is a graph of the results of measurements on Hisil 233 by the laser diffractoin method.
Figure 5:
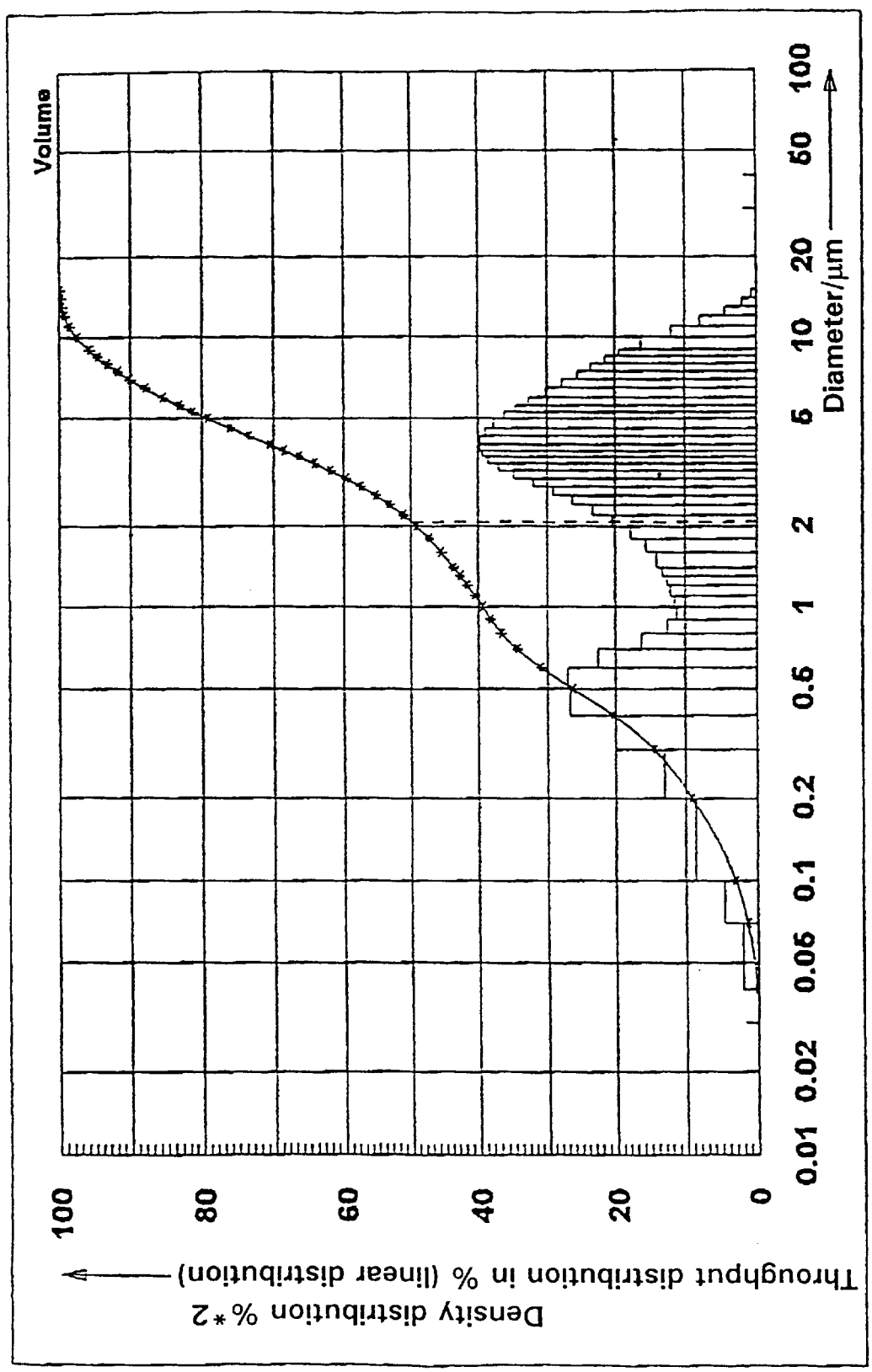
FIG. 5 is a graph of the results of measurements on silica according to the invention of Example 4 by the laser diffraction method.
Figure 6:
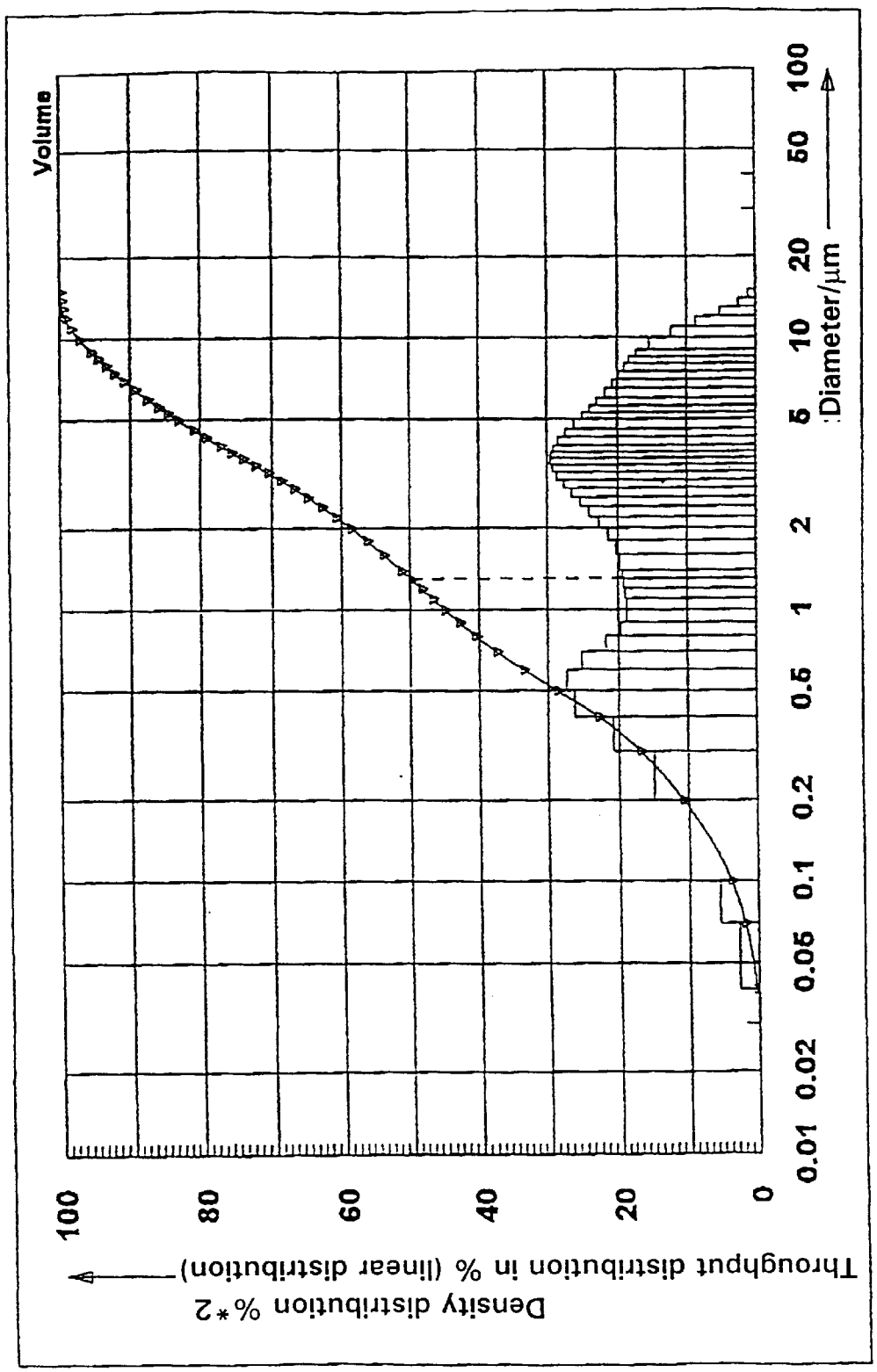
FIG. 6 is a graph of the results of measurements on silica according to the invention of Example 2 by the laser diffraction method.

The precipitated silica according to the invention may be incorporated as reinforcing filler into vulcanizable rubber mixtures in amounts of 2 to 200 parts, referred to 100 parts of rubber, as powder, microbeads or granules, with or without silane modification.

The addition of one or more of the aforementioned silanes to the rubber mixture may take place together with the silicas according to the invention, the reaction between the filler and silane occurring during the mixing process at elevated temperatures (in situ modification) or in an already pre-modified form (for example DE-PS 40 04 781), in other words both reaction partners are reacted outside the actual preparation of the mixture.

A further possibility is to modify the precipitated silicas with organosilanes in mixtures of 0.5 to 50 parts, referred to 100 parts of precipitated silica, in particular 2 to 15 parts, referred to 100 parts of precipitated silica, wherein the reaction between the precipitated silica and organosilane is carried out during the preparation of the mixture (in situ) or outside the preparation, by spraying followed by tempering the mixture, or by mixing the silane and the silica suspension followed by drying and tempering.

In addition to mixtures that contain as fillers exclusively the silicas according to the invention, with and without organosilanes according to formulae I to III, the rubber mixtures may in addition be filled with one or more fillers having a greater or lesser reinforcing effect. For example a blend of carbon blacks (for example furnace, gas, flame, acetylene carbon blacks) and the silicas according to the invention, with and without silane, as well as of natural fillers, for example clays, silica chalks, further known and commercially available silicas, and the silicas according to the invention, may be used.

The blend ratio is governed in this case, as in the metering of the organosilanes, according to the property spectrum to be achieved in the finished rubber mixture.

The ratio of the precipitated silicas according to the invention to the other aforementioned fillers may be 5–95%.

In addition to the silica according to the invention, the organosilanes and other fillers, the elastomers form a further important constituent of the rubber mixture. The silicas according to the invention may be used in all types of rubber crosslinkable with accelerators/sulfur, as well as rubbers crosslinkable with peroxides. Elastomers that may be mentioned in this connection are natural and synthetic elastomers, oil-extended or not, as individual polymers or blends with other rubbers, for example natural rubbers, butadiene rubbers, isoprene rubbers, butadiene-stirene rubbers, in particular SBR, produced by means of solution polymerisation, as well as butadiene-acrylonitrile rubbers, butyl rubbers, and terpolymers of ethylene, propylene and unconjugated dienes. The following additional rubbers are also suitable for rubber mixtures with the aforementioned rubbers:

Carboxyl rubbers, epoxide rubbers, trans-polypentenamers, halogenated butyl rubbers, 2-chlorobutadiene rubbers, ethylene-vinyl acetate copolymers, ethylene-propylene copolymers, and optionally also chemical derivatives of natural rubber as well as modified natural rubbers.

Further additives such as plasticisers, stabilizers, activators, pigments, anti-oxidants and processing aids may be used in the conventional amounts.

The precipitated silicas according to the invention, with and without silane, may be used in all rubber applications, particularly in tires, above all in tire carcasses, but also for example in conveyor belts, seals, V-belts, hoses, shoe soles, etc.

The precipitated silica according to the invention may furthermore be used in battery separators, in silicone rubber, and as supporting silica.

In order to achieve a good property spectrum in a polymer mixture, the dispersion of the precipitated silica in the matrix, i.e. the polymer, is of decisive importance.

It has been found that the wk coefficient is a measure of the dispersibility of a precipitated silica.

The wk coefficient is determined as follows:

The measurement is based on the principle of laser diffraction, a CILAS granulometer 1064 L being used for the measurement.

To carry out the determination 1.3 g of the precipitated silica is added to 25 ml of water and treated for 4½ minutes with ultrasound at 100 W (90% pulsed). The solution is then transferred to the measuring cell and treated for a further minute with ultrasound.

The detection is performed during the ultrasound treatment using two lasers diodes arranged at different angles to the sample. The laser beams are diffracted according to the principle of light diffraction. The resultant diffraction pattern is evaluated with a computer. The method enables the particle size distribution to be determined over a wide measurement range (ca. 40 nm–500 $\mu$m).

An essential point in this connection is that the energy supplied by the ultrasound simulates the energy supplied by mechanical forces in industrial mixing equipment used in the tire industry.

The results of the measurements of the particle size distribution of precipitated silicas according to the invention and of comparison silicas are shown in FIGS. 1–6.

The graphs show a first maximum in the particle size distribution in the range around 1.0–100 $\mu$m, and a further maximum in the range <1.0 $\mu$m. The peak in the range 1.0–100 $\mu$m indicates the proportion of uncomminuted silica particles after the ultrasound treatment. These extremely coarse particles are poorly dispersed in the rubber mixtures. The second peak corresponding to substantially smaller particle sizes (<1.0 $\mu$m) represents that proportion of silica particles that have been comminuted during the ultrasound treatment. These very small particles can be dispersed extremely well in rubber mixtures.

The wk coefficient denotes the ratio of the peak height of the non-degradable particles (B), whose maximum is in the range 1.0–100 $\mu$m (B'), to the peak height of the degraded particles (A), whose maximum is in the range <1.0 $\mu$m (A').

Figure 7:
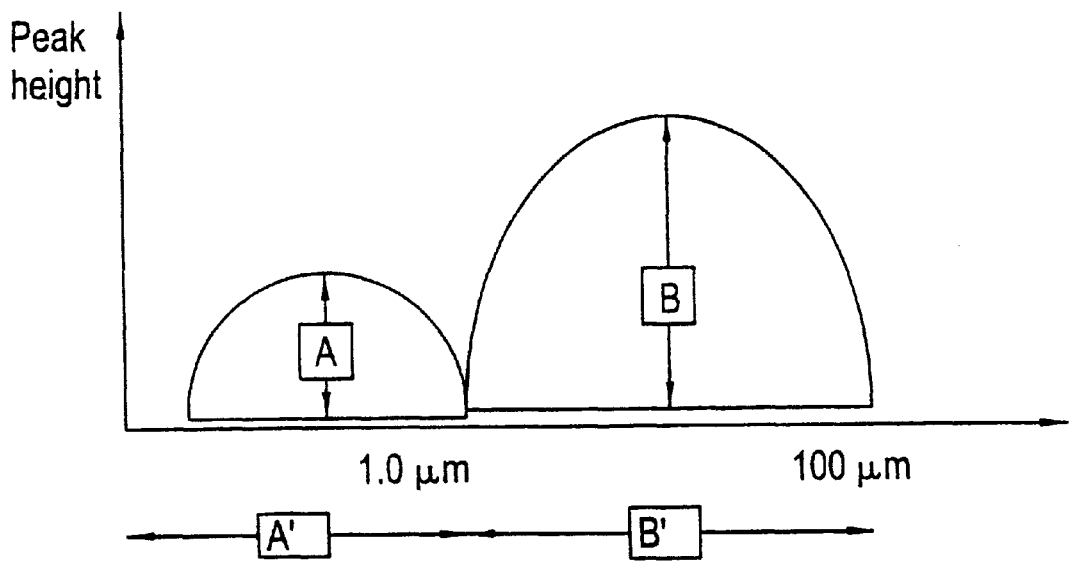
FIG. 7 is a graphic representation of the determination of the wk coefficient.

The schematic diagram according to FIG. 7 illustrates these relationships.

The wk coefficient is thus a measure of the "degradability" (=dispersibility) of the precipitated silica. It is found that a precipitated silica is more easily dispersible the smaller the wk coefficient, i.e. the more particles that are degraded during incorporation into rubber.

The silicas according to the invention have wk coefficients <3.4. The maximum in the particle size distribution of the non-degradable particles of the precipitated silica according to the invention is in the range 1.0–100 $\mu$m. The maximum in the particle size distribution of the degraded particles of the precipitated silica according to the invention is in the range <1.0 $\mu$m. Known precipitated silicas have substantially higher wk coefficients and other maxima in the particle size distributions measured with the CILAS granulometer 1064 L and thus have a worse dispersibility.

The dispersibility of a precipitated silica is expressed by the dispersion coefficient D. This is measured according to the following formula:

$$D[\%] = \frac{\text{Sum of particle area/image area} \times 10000 \times \text{Medalia factor}}{\text{Filler volume} \times \text{image area}}$$

$$\text{Medalia factor} = \frac{\text{Filler volume}/100 + 0.78}{2}$$

The evaluation is carried out by light microscopy at 150×magnification on polished sections of the vulcanisates. Particles of size larger than 28 $\mu$m$^2$ were evaluated as non-dispersible particles. 40 images were evaluated.

EXAMPLES

The following substances are used in the examples:

| | |
|---|---|
| SMR 20 | Natural rubber |
| SMR 10 | Natural rubber |
| Buna CB 10 | Butadiene rubber |
| Krynol 1712 | Stirene-butadiene rubber based on emulsion polymerisation |
| Buna SB 1500 | Stirene-butadiene rubber based on emulsion polymerisation |
| X 50 S | 50:50 blend of Si 69 (bis(3-triethoxy silylpropyl)tetrasulfane and N 330 |
| ZnO RS | Zinc oxide |
| Stearic acid | |
| Sunpar 150 | Paraffin oil |
| Naftolen ZD | Aromatic oil |
| Novares C 80 | Resin |
| Koresin (Pastilles) | Phenol-formaldehyde resin |
| Antilux 654 | Microcrystalline wax |
| Vulkanox 4020 | N-(1,3-dimethylbutyl)-N'-phenyl-p-phenylenediamine |
| Vulkanox 4010 NA/LG | Antioxidant |
| Vulkanox HS/LG | Antioxidant |
| Protector G 35 P | Antiozonant wax |
| Cofill 11 GR | Resorcinol-based bonding agent |
| HEXA K | Hexamethylenetetramine |
| DPG | Diphenyl guanidine |
| CBS | N-cyclohexyl-2-benzthiazylsulfenamide |
| TBBS | N-tert.butyl-2-benzthiazylsulfenamide |
| Sulfur | |
| Crystex, insoluble | Insoluble sulfur |

| Comparison products: | |
|---|---|
| Corax N 326 | Carbon black from Degussa |
| Corax N 375 | Carbon black from Degussa |
| Corax N 660 | Carbon black from Degussa |
| Ultrasil VN2 | Silica from Degussa with a $N_2$-surface of |

-continued

Comparison products:

| | |
|---|---|
| Ultrasil Vn3 | ca. 125 m²/g; $Al_2O_3$ content 0.16 wt. % Silica from Degussa with a $N_2$-surface of ca. 125 m²/g; $Al_2O_3$ content 0.17 wt. % |
| Hisil 233 | Silica from PPG with a $N_2$-surface of ca. 150 m²/g; $Al_2O_3$ content 0.33 wt. % |
| Perkasil KS | Silica from Akzo with a $N_2$-surface of 300 ca. 125 m²/g; $Al_2O_3$ content 0.14 wt. % |
| Perkasil KS | Silica from Akzo with a $N_2$-surface of 404 ca. 160 m²/g; $Al_2O_3$ content 0.15 wt. % |
| Perkasil KS | Silica from Akzo with a $N_2$-surface of 408 ca. 160 m²/g; $Al_2O_3$ content 0.15 wt. % |
| Zeosil 1165 | Silica from Rhone-Poulenc with a $N_2$-MP surface of ca. 150 m²/g; $Al_2O_3$ content 0.65 wt. % |

Example 1

Preparation of a Precipitated Silica in the $N_2$-range from 120 to 140 m²/g 46 m³ of water are heated in a vat to 88° C. while stirring. While maintaining the temperature at 88° C. there are added at pH 9.0, which is adjusted by addition of water glass, sufficient water glass (modulus 3.42, density 1.348) and 96% sulfuric acid under constant stirring, so that after 125 minutes a solids content of 88.5 g/l is reached. In addition 265 l of an aluminum sulfate solution (density 1.28) are metered in at the same time while stirring constantly. Sulfuric is then added until a pH of between 3 and 5 is reached. The solid is separated on a filter press, washed, and then dried and if necessary ground.

The precipitated silica obtained has the following physico-chemical data:

| | |
|---|---|
| BET surface area | 23 m²/g |
| CTAB surface area | 110 m²g |
| BET/CTAB | 1.12 |
| DBP No. | 203 ml/100 g |
| Sears No. | 9.7 |
| $Al_2O_3$ content | 0.59% |
| wk coefficient | 0.5 |

Example 2

Preparation of a Precipitated Silica in the $N_2$-range from 130 to 150 m²/g 53.5 l of water are heated to 80° C. in a vat while stirring. While maintaining the temperature at 80° C., there are added at pH 9.0, which is adjusted by adding water glass, sufficient water glass (modulus 3.42, density 1.348) and 50% sulfuric acid under constant stirring, so that after 67 minutes a solids content of 92.9 g/l is reached. In addition 0.255 l of an aluminum sulfate solution (density 1.28) is metered in while stirring constantly. Sulfuric acid is then added until a pH of between 3 and 5 is reached. The solid is separated on a filter press, washed, and then subjected to a brief or prolonged drying and if necessary ground.

The precipitated silica obtained has the following physico-chemical data:

| | |
|---|---|
| BET surface area | 129 m²/g |
| CTAB surface area | 124 m²g |
| BET/CTAB | 1.04 |
| DBP No. | 243 ml/100 g |
| Sears No. | 16.2 |
| $Al_2O_3$ content | 0.59% |

Example 3

Preparation of a Precipitated Silica in the $N_2$-range from 120 to 140 m²/g 54.6 l of water are heated to 80° C. in a vat while stirring. While maintaining the temperature at 80° C. there are added at pH 9.0, which is adjusted by adding water glass, sufficient water glass (modulus 3.42, density 1.348) and 50% sulfuric acid under constant stirring, so that after 67 minutes a solids content of 91.4 g/l is reached. In addition 0.784 l of an aluminum sulfate solution (density 1.28) is metered in while stirring constantly. Sulfuric acid is then added until a pH of between 3 and 5 is reached. The solid is separated on a filter press, washed, and then subjected to a brief or prolonged drying and if necessary ground.

The precipitated silica obtained has the following physico-chemical data:

| | |
|---|---|
| BET surface area | 152 m²/g |
| CTAB surface area | 129 m²g |
| BET/CTAB | 1.19 |
| DBP No. | 241 ml/100 g |
| Sears No. | 16.4 |
| $Al_2O_3$ content | 0.98% |

Example 4

Preparation of a Precipitated Silica in the $N_2$-range from 120 to 140 m² g 50.4 l of water are heated to 80° C. in a vat while stirring. While maintaining the temperature at 80° C. there are added at pH 9.0, which is adjusted by adding water glass, sufficient water glass (modulus 3.42, density 1.348) and 50% sulfuric acid under constant stirring, so that after 67 minutes a solids content of 97.6 g/l is reached. In addition 1.47 l of an aluminum sulfate solution (density 1.28) is metered in while stirring constantly. Sulfuric acid is then added until a pH of between 3 and 5 is reached. The solid is separated on a filter press, washed, and then subjected to a brief or prolonged drying and if necessary ground.

The precipitated silica obtained has the following physico-chemical data:

| | |
|---|---|
| BET surface area | 130 m²/g |
| CTAB surface area | 101 m²g |
| BET/CTAB | 1.29 |
| DBP No. | 227 ml/100 g |
| Sears No. | 18.4 |
| $Al_2O_3$ content | 1.96% |

Example 5

Preparation of a Precipitated Silica in the $N_2$-range from 140 to 160 m²/g 50.4 l of water are heated to 80° C. in a vat while stirring. While maintaining the temperature at 80° C. there are added at pH 9.0, which is adjusted by adding water glass, sufficient water glass (modulus 3.42, density 1.348) and 50% sulfuric acid under constant stirring, so that after 67 minutes a solids content of 99.4 g/l is reached. In addition 2.21 l of an aluminum sulfate solution (density 1.28) is metered in while stirring constantly. Sulfuric acid is then added until a pH of between 3 and 5 is reached. The solid is separated on a filter press, washed, and then subjected to a brief or prolonged drying and if necessary ground.

The precipitated silica obtained has the following physico-chemical data:

| | |
|---|---|
| BET surface area | 154 m$^2$/g |
| CTAB surface area | 100 m$^3$g |
| BET/CTAB | 1.54 |
| DBP No. | 222 ml/100 g |
| Sears No. | 16.6 |
| Al$_2$O$_3$ content | 4.28% |

Example 6

Determination of the wk coefficient with the Cilas granulometer 1064 L on a silica according to the invention having a BET surface area of 110–130 m$^2$/g according to Example 1 and comparison with standard silicas in the same surface area range. In addition the values B, A, B' and A' according to FIG. 7 are specified.

| Product name | CTAB surface [m$^2$/g] | wk coefficient | B | A | B' [µm] | A' [µm] |
|---|---|---|---|---|---|---|
| Ultrasil VN2 | 120 | 20 | 40 | 2 | 13.3 | 0.5 |
| Perkasil KS 300 | 120 | 6 | 24 | 4 | 11.7 | 0.5 |
| KS Example 1 | 123 | 0.5 | 19 | 37.5 | 7.7 | 0.5 |

Example 7

Determination of the wk coefficient with the Cilas granulometer 1064 L on a silica according to the invention having a BET surface area of 120–140 m$^2$/g and comparison with standard silica in the same surface area range. In addition the values B, A, BD and A' according to FIG. 7 are specified.

| Product name | CTAB surface [m$^2$/g] | wk coefficient | B | A | B' [µm] | A' [µm] |
|---|---|---|---|---|---|---|
| Hisil 233 | 138 | 26.7 | 32. | 1.2 | 14.4 | 0.5 |
| KS Example 9 | 130 | 1.5 | 40 | 27 | 3.4 | 0.5 |
| KS Example 7 | 129 | 1.1 | 30 | 27.5 | 3.0 | 0.5 |

Example 8

Determination of the wk coefficient with the Cilas granulometer 1064 L on a silica according to the invention having a BET surface area of 140–160 m$^2$/g and comparison with standard silicas in the same surface area range. In addition the values B, A, B' and A' according to FIG. 7 are specified.

TABLE 2

| Product name | CTAB surface [m$^2$/g] | wk coefficient | B | A | B' [µm] | A' [µm] |
|---|---|---|---|---|---|---|
| Zerosil 1165 MP | 150 | 3.4 | 38.7 | 11.4 | 7.9 | 0.6 |
| Perkasil 404 | 160 | 18.3 | 33 | 1.8 | 15.4 | 0.6 |

TABLE 2-continued

| Product name | CTAB surface [m$^2$/g] | wk coefficient | B | A | B' [µm] | A' [µm] |
|---|---|---|---|---|---|---|
| Perkasil 408 | 160 | 12.9 | 27 | 2.1 | 13.4 | 0.6 |
| KS Example 5 | 154 | 1.7 | 22 | 13 | 3.4 | 0.55 |
| KS Example 3 | 152 | 1.4 | 33 | 24 | 3.0 | 0.5 |

WK coefficients of the precipitated silicas according to the invention

| Example No. | WK | B | A | B' [µm] | A' [µm] |
|---|---|---|---|---|---|
| 1 | 0.5 | 19 | 37.5 | 7.7 | 0.5 |
| 2 | 1.1 | 30 | 27.5 | 3.0 | 0.5 |
| 3 | 1.4 | 33 | 24 | 3.0 | 0.5 |
| 4 | 1.5 | 40 | 27 | 3.4 | 0.5 |
| 5 | 1.7 | 22 | 13 | 3.4 | 0.55 |

Example 9

Measurement results of the precipitated silicas according to the invention of Example 6 and Example 7 compared to standard precipitated silicas (see FIGS. 1–6 in the Appendix).

Example 10

Precipitated silica according to the invention of Example 4 (with a Al$_2$O$_3$ content of 0.59 wt. %) compared to standard silica and the hitherto used blend of carbon black N 660 and carbon black N 375 in a NR/BR mixture for a tire side wall:

| | 1 | 2 | 3 |
|---|---|---|---|
| SMR 10 | 50 | 50 | 50 |
| Buna CB 10 | 50 | 50 | 50 |
| Corax N 660 | 20 | 20 | 20 |
| Corax N 375 | 30 | — | — |
| Zeosil 1165 MP | — | 30 | — |
| Silica according to the invention (Example 4) | — | — | 30 |
| X 50 S | — | 3 | 3 |
| ZnO RS | 3.5 | 3.5 | 3.5 |
| Stearic acid | 2 | 2 | 2 |
| Naftolen ZD | 7 | 7 | 7 |
| Novares C 80 | 3 | 3 | 3 |
| Protector G 35 P | 3 | 3 | 3 |
| Vulkanox 4020 | 2.5 | 2.5 | 2.5 |
| Vulkacit D | — | 2 | 2 |
| Vulkacit CZ-MG-C | — | 1 | 1 |
| TBBS | 0.8 | — | — |
| Sulfur | 1.8 | 1.8 | 1.8 |
| Mooney Viscosity ML (1 + 4) | 56 | 70 | 64 |
| Vulcanisate data: 160 · C/t$_{95}$ % t$_{95}$ [%] | 12.4 | 6.8 | 6.4 |
| Modulus 300% [MPa] | 5.2 | 7.0 | 7.2 |
| Heat Build Up ΔT$_{Centre}$ [° C.] | 88 | 64 | 51 |
| Permanent Set [%] | 2.6 | 0.8 | 0.5 |
| Phillips-value | 7 | 7 | 8 |
| Ball Rebound 60° C. | 67 | 74 | 79 |
| tan δ 60° C. | 0.129 | 0.080 | 0.067 |

The silica according to the invention of Example 9 results in a higher vulcanisation rate, higher modulus values, lower heat build-up (corresponding to a longer tire life) and a higher ball rebound 60° C. and a lower tan δ 60° C. (corresponding to a lower rolling resistance), compared to the standard silica Zeosil 1165 MP with an Al$_2$O$_3$ content of 0.65 wt. % and a CTAB surface area of 150 m$^2$/g and a wk coefficient of 3.4, and to the carbon black N 375 hitherto used in a side wall mixture.

Example 11

Precipitated silica according to the invention of Example 1 compared to the hitherto used carbon black N 326 in a NR/SBR mixture for a tire carcase with a special bonding system:

|  | 1 | 2 |
|---|---|---|
| SMR 10 | 60 | 60 |
| Buna SB 1500 | 40 | 40 |
| Corax N 326 | 50 | — |
| Silica according to the invention (Example 1) | — | 50 |
| Ultrasil VN 3 | 15 | 15 |
| X 50 S | — | 7 |
| ZnO RS | 8 | 8 |
| Stearic acid | 1 | 1 |
| Cofill 11 GR | 5 | 5 |
| Naftolen ZD | 3 | 3 |
| Vulkanox 4010 NA/LG | 0.5 | 0.5 |
| Vulkanox HS/LG | 0.8 | 0.8 |
| HEXA K | 1.5 | 1.5 |
| TBBS | 0.8 | 1.5 |
| Crystex, insoluble | 4 | 4 |
| DPG | — | 2 |
| Vulcanisate data: 160 · C/t$_{95}$ % | | |
| Separation strength (tack) (N) | 13.8 | 26.7 |

The silica according to the invention of Example 1 results in a higher separation strength (corresponding to a ore reliable processing in the tire assembly) compared to the carbon black N 326 hitherto used in a carcase mixture with a special bonding system.

Further variations and modifications of the foregoing will be apparent to those skilled in the art and are intended to be encompassed by the claims appended hereto.

German priority application 198 40 153.1 is relied on and incorporated herein by reference.

We claim:

1. Precipitated silica, characterized by a $Al_2O_3$ content of 0.2 to 5.0 wt. % and a wk coefficient of less than 3.4.

2. Precipitated silica according to claim 1, characterized in that it has a CTAB surface area of 80 to 139 m$^2$/g.

3. Precipitated silica according to claim 1, characterized in that it has a BET surface area of 80 to 180 m$^2$/g.

4. Precipitated silica according to claim 2, characterized in that it has a BET surface area of 80 to 180 m$^2$/g.

5. Precipitated silica according to claim 1, characterized by the following parameters:

| BET surface area | 80–180 m$^2$/g |
|---|---|
| CTAB surface area | 80–139 m$^2$/g |
| BET/CTAB ratio | 1.0–1.6 |
| Sears No. (consumption of 0.1 N NaOH) | 5–25 ml |
| DBP No. | 200–300 ml/100 g |
| Degraded particles | <1.0 μm |
| Non-degradable particles | 1.0–100 μm. |

6. Precipitated silica according to claim 2, characterized by the following parameters:

| BET surface area | 80–180 m$^2$/g |
|---|---|
| BET/CTAB ratio | 1.0–1.6 |
| Sears No. (consumption of 0.1 N NaOH) | 5–25 ml |
| DBP No. | 200–300 ml/100 g |
| Degraded particles | <1.0 μm |
| Non-degradable particles | 1.0–100 μm. |

7. Precipitated silica according to claim 3, characterized by the following parameters:

| CTAB surface area | 80–139 m$^2$/g |
|---|---|
| BET/CTAB ratio | 1.0–1.6 |
| Sears No. (consumption of 0.1 N NaOH) | 5–25 ml |
| DBP No. | 200–300 ml/100 g |
| Degraded particles | <1.0 μm |
| Non-degradable particles | 1.0–100 μm. |

8. A process for preparing the precipitated silica according to claim 1, comprising simultaneously reacting an alkali silicate solution with a mineral acid and an aluminum salt solution in aqueous media at temperatures of 60 to 95° C., at a pH of 7.0 to 10.0, until a solids concentration of 40 to 10 g/l is reached, adjusting the pH to a value of 3 to 5, and thereby obtaining the precipitated silica.

9. A process for preparing a precipitated silica according, to claim 5, comprising: simultaneously reacting an alkali silicate solution with a mineral acid and an aluminum sulfate solution at temperatures of 60°–95° C., at a pH of 7.0–10.0, while stirring constantly, wherein addition of the alkali silicate solution, the mineral acid, and the aluminum sulfate solution is optionally discontinued for 30 to 90 minutes, continuing reacting to a solids concentration of 40–110 g/l, adjusting the pH to a value of 3 to 5, filtering off precipitated silica, washing the precipitated silica, then drying the precipitated silica, and optionally grinding or granulating the precipitated silica.

10. The process according to claim 9, wherein the filtering is performed using at least one of a chamber filter press, a membrane filter press, a band filter, a rotary filter, or an automatic membrane filter press.

11. The process according to claim 9, wherein the drying includes drying with a pneumatic dryer, a rack dryer, a flash dryer, or a spin-flash dryer.

12. The process according to claim 9, wherein the drying includes drying a liquefied filter cake obtained from the filtering in a spray drier with an atomizer, a two-substance nozzle, a single-substance nozzle, or an integrated flow bed.

13. The process according to claim 9, wherein the granulating is carried out using a rolling compactor.

14. A vulcanizable rubber mixture containing as filler the precipitated silica according to claim 1 having the following physico-chemical parameters:

| BET surface area | 80–180 m$^2$/g |
|---|---|
| CTAB surface area | 80–139 m$^2$/g |
| BET/CTAB ratio | 1.0–1.6 |
| Sears No. (consumption of 0.1 N NaOH) | 5–25 ml |

| | |
|---|---|
| DBP No. | 200–300 ml/100 g |
| Degraded particles | <1.0 μm |
| Non-degradable particles | 1.0–100 μm. |

15. A vulcanizate made from the vulcanizable rubber mixture of claim 14.

16. A tire containing the precipitated silica of claim 1.

17. A tire made from the vulcanizable rubber mixture of claim 14.

18. A silica comprising: the precipitated silica according to claim 1, wherein surfaces of the precipitated silica are modified with organosilanes of formulae I to III:

$$[R^1{}_n\!-\!(RO)_{3-n}Si\!-\!(Alk)_m\!-\!(Ar)_p]_q[B] \quad (I),$$

$$R^1{}_n(RO)_{3-n}Si\text{-(alkyl)} \quad (II),$$

or $$R^1{}_n(RO)_{3-n}Si\text{-(alkenyl)} \quad (III),$$

in which

B denotes —SCN, —SH, —Cl, —NH$_2$ (when q=1) or —S$_x$— (when q=2),

R and R$^1$ denote an alkyl group with 1 to 4 carbon atoms, a phenyl radical, all radicals R and R$^1$ in each case being the same or having a different meaning, R denotes a C$_1$ to C$_4$-alkyl group or a C$_1$ to C$_4$-alkoxy group, n denotes 0, 1 or 2, Alk denotes a divalent linear or branched hydrocarbon radical with 1 to 18 carbon atoms, m denotes 0 or 1, Ar denotes an arylene radical with 6 to 12 carbon atoms, p denotes 0 to 1, provided that p and n do not simultaneously denote 0, x denotes an integer from 2 to 8, Alkyl denotes a monovalent linear or branched saturated hydrocarbon radical with 1 to 20 carbon atoms, Alkenyl denotes a monovalent linear or branched unsaturated hydrocarbon radical with 2 to 20 carbon atoms, and q denotes 1 or 2.

19. A process for preparing the silica according to claim 18, comprising: mixing the precipitated silica with the organosilane in an amount of 0.5 to 50 parts organosilane per 100 parts of the precipitated silica, wherein a reaction between the precipitated silica and the organosilane is carried out during preparation of the mixture, or outside preparation of the mixture by spraying and then tempering the mixture, or by mixing the organosilane in a suspension including the precipitated silica, followed by drying and tempering.

20. The process according to claim 19, wherein the organosilane is present in the amount of 1 to 15 parts per 100 parts of the precipitated silica.

\* \* \* \* \*